(12) United States Patent
Chiang

(10) Patent No.: US 11,612,036 B2
(45) Date of Patent: Mar. 21, 2023

(54) DRIVING SYSTEM FOR DRIVING LIGHT-EMITTING MODULES AND LIGHT-EMITTING SYSTEM INCLUDING THE SAME

(71) Applicant: MACROBLOCK, INC., Hsinchu (TW)

(72) Inventor: Ting-Ta Chiang, Hsinchu (TW)

(73) Assignee: MACROBLOCK, INC., Hsinchu (TW)

( * ) Notice: Subject to any disclaimer, the term of this patent is extended or adjusted under 35 U.S.C. 154(b) by 0 days.

(21) Appl. No.: 17/659,866

(22) Filed: Apr. 20, 2022

(65) Prior Publication Data

US 2022/0361305 A1    Nov. 10, 2022

(30) Foreign Application Priority Data

Apr. 28, 2021   (TW) .................................. 110115376

(51) Int. Cl.
| | |
|---|---|
| *H05B 45/10* | (2020.01) |
| *H05B 45/14* | (2020.01) |
| *H05B 45/46* | (2020.01) |
| *H05B 45/54* | (2020.01) |

(52) U.S. Cl.
CPC ............. *H05B 45/46* (2020.01); *H05B 45/14* (2020.01); *H05B 45/54* (2020.01)

(58) Field of Classification Search
CPC ........ H05B 45/10; H05B 45/14; H05B 45/30; H05B 45/325; H05B 45/40; H05B 45/46; H05B 45/54
See application file for complete search history.

(56) References Cited

U.S. PATENT DOCUMENTS

| | | | |
|---|---|---|---|
| 8,084,961 B2* | 12/2011 | Chao ...................... | H05B 45/46 315/307 |
| 10,721,804 B2* | 7/2020 | Chan ..................... | H05B 45/347 |
| 11,076,463 B1* | 7/2021 | Chiang ................. | H05B 45/10 |
| 2008/0144236 A1* | 6/2008 | Chiang ................ | H05B 45/397 361/18 |

\* cited by examiner

*Primary Examiner* — Thai Pham
(74) *Attorney, Agent, or Firm* — Akerman LLP; Peter A. Chiabotti

(57) ABSTRACT

A driving system for driving light-emitting modules includes driving current generation modules connected respectively to the light-emitting modules, and a brightness modulation module connected to the current generation modules and the light-emitting modules. Each driving current generation module is configured to receive signals from the brightness modulation module to control a driving current that flows through the light-emitting module it is connected to. The brightness modulation module is configured to generate the signals based on voltages provided at terminals of the light-emitting modules that are connected to the driving current generation modules.

19 Claims, 9 Drawing Sheets

DRIVING SYSTEM FOR DRIVING LIGHT-EMITTING MODULES AND LIGHT-EMITTING SYSTEM INCLUDING THE SAME

CROSS-REFERENCE TO RELATED APPLICATION

This application claims priority of Taiwanese Invention Patent Application No. 110115376, filed on Apr. 28, 2021.

FIELD

The disclosure relates to a light-emitting system, and more particularly to a driving system of the light-emitting system that drives multiple light-emitting modules of the light-emitting system.

BACKGROUND

A conventional driving system for light-emitting diodes (LEDs) is illustrated in FIG. 1. The conventional driving system includes a power supply 11, multiple LED strings 12, multiple switches 13, multiple current sources 14, a brightness management device 15, and a voltage divider 16. The power supply 11 provides a driving voltage. The LED strings 12 are electrically connected to the power supply 11, and each include multiple LEDs 121 that are electrically connected in series. The switches 13 are electrically connected to the LED strings 12, respectively. The current sources 14 are electrically connected to the switches 13, respectively. The switches 13 and the current sources 14 collectively constitute multiple driving current generation modules, each of which includes a respective one of the switches 13 and one of the current sources 14 that is connected to the respective one of the switches 13. The brightness management device 15 is electrically connected to the switches 13 and the current sources 14. The switches 13 when being turned on conduct currents generated by the current sources 14 to the LED strings 12.

Because of variables that occur during the manufacture of the LEDs 121 included in the LED strings 12, the LEDs 121 may have different forward voltages, and therefore voltages across the LED strings 12 may be different. In order for each LED string 12 to operate normally, the driving voltage provided by the power supply 11 is raised to meet a highest one of the voltages required by the LED strings 12 plus a working voltage of the driving current generation modules that is sufficient for normal operation of the driving current generation modules. However, said driving voltage provided by the power supply 11 makes the driving current generation modules that are connected to the LED strings 12 requiring lower voltages operate at voltages higher than their sufficient working voltage, so the driving current generation modules consume more power and are at the risk of overheating.

For example, if the highest one and the lowest one of the voltages required by the LED strings 12 are 32 volts and 30 volts, respectively, and the sufficient working voltage of the driving current generation modules is 0.5 volts, the power supply 11 of the conventional driving system has to provide a driving voltage of 32.5 volts to each LED string 12. In this situation, the driving current generation module connected to the 32-volt LED string 12 operates adequately at the sufficient working voltage of 0.5 volts. However, the driving current generation module connected to the 30-volt LED string 12 operates at a voltage that is 2 volts higher than its sufficient working voltage, consumes more power than necessary, and generates more heat. The conventional driving system has drawbacks of wasting power and overheating.

SUMMARY

Therefore, an object of the disclosure is to provide a driving system and a light-emitting system that can alleviate at least one of the drawbacks of the prior art.

According to one aspect of the disclosure, the driving system is for driving a number N of light-emitting modules, wherein N is an integer that is no less than two. The light-emitting modules each have a first terminal for receiving a supply voltage and a second terminal. The light-emitting modules each, when a current flows therethrough, provide a working voltage thereacross having a magnitude positively correlated to a magnitude of the current. The driving system includes a brightness modulation module and a number N of driving current generation modules corresponding respectively to the light-emitting modules. Each of the driving current generation modules is electrically connected between ground and the second terminal of the corresponding one of the light-emitting modules. Each of the driving current generation modules is configured to receive a periodic switch signal and a magnitude control signal, and to, when the periodic switch signal is at an active logic level, provide a driving current that has a magnitude equaling a current magnitude indicated by the magnitude control signal, and that flows through the corresponding one of the light-emitting modules so a channel voltage having a magnitude which equals subtracting the magnitude of the working voltage of the corresponding one of the light-emitting modules from a magnitude of the supply voltage is provided at the second terminal of the corresponding one of the light-emitting modules. The brightness modulation module is electrically connected to the current generation modules and the second terminals of the light-emitting modules. The brightness modulation module is configured to, with respect to each of the driving current generation modules, generate the periodic switch signal and the magnitude control signal to be sent to the driving current generation module, and output the periodic switch signal and the magnitude control signal to the driving current generation module. The brightness modulation module is further configured to, with respect to each of the driving current generation modules, compare the channel voltage provided at the second terminal of the corresponding one of the light-emitting modules with a reference voltage. The brightness modulation module is further configured to, with respect to each of the driving current generation modules and when determining that the channel voltage exceeds the reference voltage in magnitude, modulate the magnitude control signal by increasing the current magnitude indicated by the magnitude control signal.

According to one aspect of the disclosure, the light-emitting system includes the driving system and the number N of light-emitting modules that are electrically connected to the number N of driving current generation modules of the driving system, respectively, and that receive the supply voltage.

BRIEF DESCRIPTION OF THE DRAWINGS

Other features and advantages of the disclosure will become apparent in the following detailed description of the embodiment(s) with reference to the accompanying drawings, of which.

DETAILED DESCRIPTION

Figure 1:
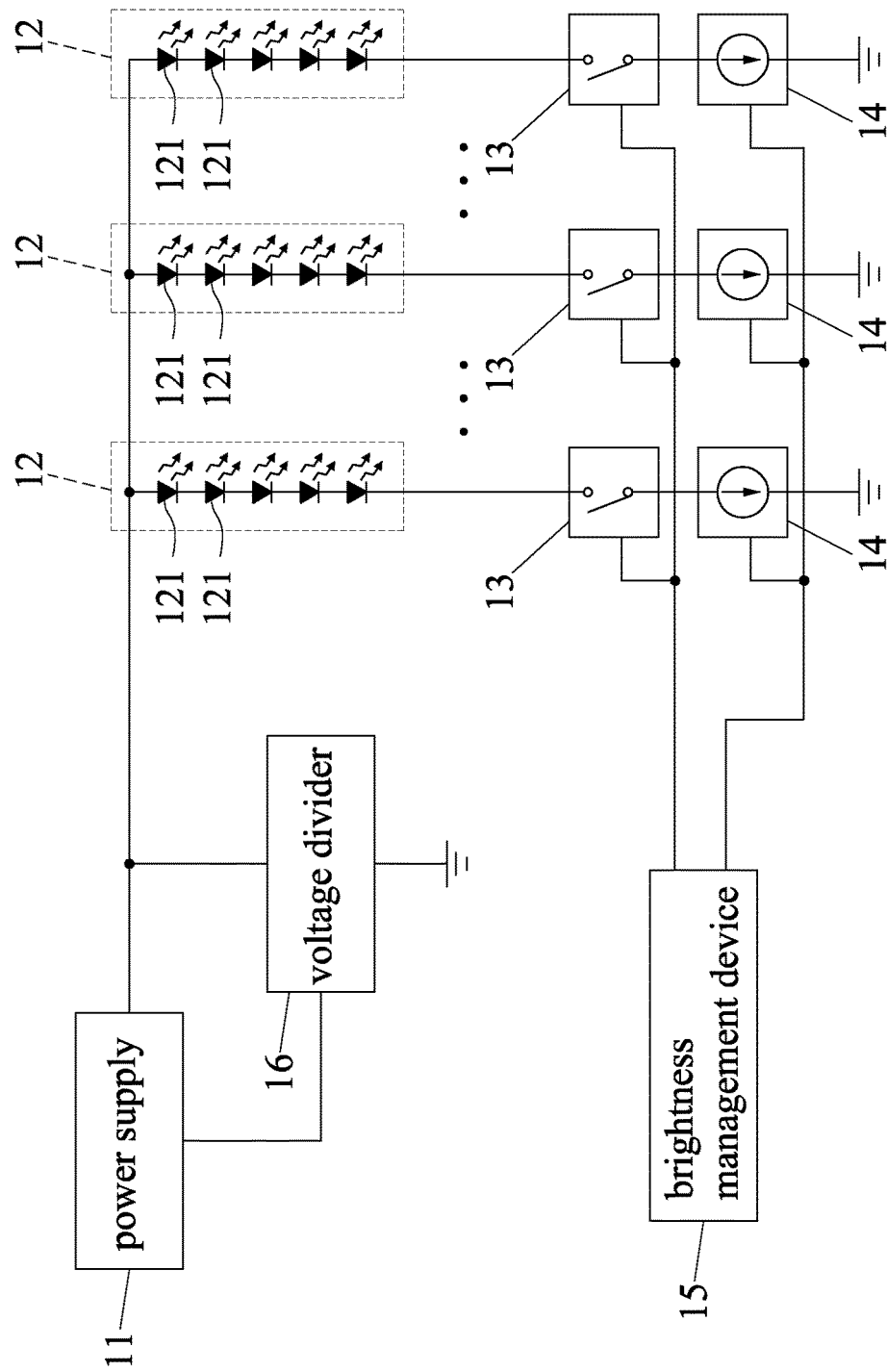
FIG. 1 is a schematic diagram of a conventional driving system.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
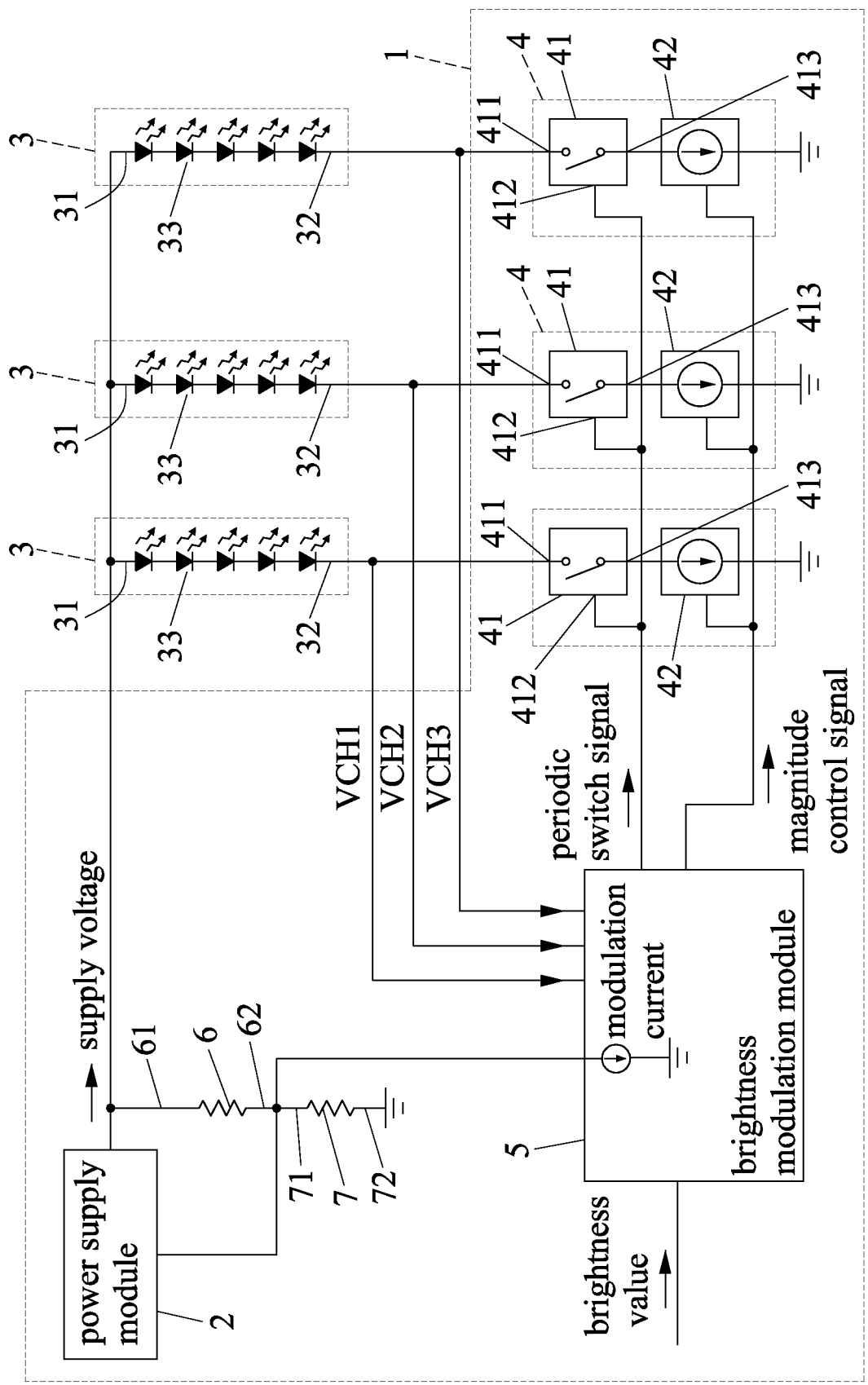
FIG. 2 is a schematic diagram that exemplarily illustrates a light-emitting system according to an embodiment of the disclosure.

FIG. 2 exemplarily illustrates a light-emitting system according to an embodiment of the disclosure. The light-emitting system includes a driving system 1 and a number N of light-emitting modules 3. N is an integer that is no less than two. Although three light-emitting modules 3 are illustrated in FIG. 2, the disclosure is not limited thereto.

Each light-emitting module 3 is a light-emitting diode (LED) string that is composed of multiple serially connected LEDs 33. Although the light-emitting modules 3 are illustrated in FIG. 2 to each include five LEDs 33, the disclosure is not limited thereto. That is, the number of the LEDs 33 included in each light-emitting module 3 may otherwise be more than five or less than five. The light-emitting modules 3 each have a first terminal 31 and a second terminal 32 that are electrically connected to the driving system 1. The first terminal 31 of the light-emitting module 3 corresponds to an anode of a first one of the LEDs 33 included in the light-emitting module 3 that is not connected to a cathode of any of the other LEDs 33, and the second terminal 32 of the light-emitting module 3 corresponds to a cathode of a last one of said LEDs 33 that is not connected to an anode of any of the other LEDs 33. The light-emitting modules 3 are adapted to receive a supply voltage from the driving system 1 through the first terminals 31. With respect to each of the light-emitting modules 3, when a driving current flows through the light-emitting module 3, the light-emitting module 3 provides a working voltage thereacross having a magnitude positively correlated to a magnitude of the driving current. It can be appreciated that because of variables that occur during the manufacture of the LEDs 33 included in the light-emitting modules 3, the LEDs 33 may have different forward voltages, and therefore the respective working voltages across the light-emitting modules 3 may be different when the light-emitting modules 3 each receive a driving current of the same magnitude, wherein a working voltage of a light-emitting module 3 can be measured from the first terminal 31 and the second terminal 32 of the light-emitting module 3 and is equal to a sum of the forward voltages of the LEDs 33 included in the light-emitting module 3.

The driving system 1 includes a power supply module 2, a number N (which is three in the embodiment illustrated in FIG. 2) of driving current generation modules 4, a brightness modulation module 5, a first resistor 6 and a second resistor 7. The power supply module 2 is electrically connected to the first terminals 31 of the light-emitting modules 3, and is configured to generate the supply voltage and output the supply voltage to the first terminals 31 of the light-emitting modules 3. The first resistor 6 has a first terminal 61 and a second terminal 62. The second resistor 7 has a first terminal 71 and a second terminal 72. The first terminal 61 of the first resistor 6 is electrically connected to the power supply module 2 to receive the supply voltage. The second terminal 62 of the first resistor 6 is electrically connected to the first terminal 71 of the second resistor 7 and to the power supply module 2. The second terminal 72 of the second resistor 7 is connected to ground.

The brightness modulation module 5 is electrically connected to the second terminal 62 of the first resistor 6, the driving current generation modules 4 and the second terminals 32 of the light-emitting modules 3. The driving current generation modules 4 correspond respectively to the light-emitting modules 3, and are each electrically connected between ground and the second terminal 32 of the corresponding one of the light-emitting modules 3.

The driving current generation modules 4 each include a switch 41 and a current source 42. According to some embodiments, the switch 41 may be a transistor, such as a field-effect transistor (FET). The switch 41 includes a first terminal 411, a second terminal 413 and a control terminal 412. The first terminal 411 is electrically connected to the second terminal 32 of the light-emitting module 3 corresponding to the driving current generation module 4 to which the first terminal 411 belongs. The control terminal 412 is electrically connected to the brightness modulation module 5 to receive a periodic switch signal, wherein the periodic switch signal is a periodic pulse signal that transforms between an active logic level (e.g., a logic high level) and an inactive logic level (e.g., a logic low level). The current source 42 is electrically connected between the second terminal 413 of the switch 41 of the same driving current generation module 4 and ground, and is also electrically connected to the brightness modulation module 5 to receive a magnitude control signal which indicates a current magnitude. The switch 41 is configured to switch between conduction and non-conduction based on the periodic switch signal received from the brightness modulation module 5, and conducts only when the periodic switch signal is at the active logic level. The current source 42 is configured to, when the switch 41 of the same driving current generation module 4 conducts, generate the driving current based on the magnitude control signal received from the brightness modulation module 5. The driving current has a magnitude equal to the current magnitude indicated by the magnitude control signal, and flows through the light-emitting module 3 corresponding to the driving current generation module 4 to which the current source 42 belongs. The periodic switch signal that the driving current generation module 4 receives is a pulse-width modulation (PWM) signal, and is used to control an average current magnitude of the corresponding light-emitting module 3.

With respect to each of the light-emitting modules 3, when the driving current flows through the light-emitting module 3, a channel voltage (VCH1/VCH2/VCH3) that has a magnitude which equals subtracting a magnitude of the working voltage of the light-emitting module 3 from a magnitude of the supply voltage is provided at the second terminal 32 of the light-emitting module 3. Since the magnitude of the working voltage of the light-emitting module 3 is positively correlated to the magnitude of the driving current that flows through the light-emitting module 3, the channel voltage (VCH1/VCH2/VCH3) at the second terminal 32 of the light-emitting module 3 is negatively correlated to the magnitude of the driving current. It can be appreciated that the driving current generation module 4 connected to the light-emitting module 3 operates at a working voltage that is equivalent to the channel voltage (VCH1/VCH2/VCH3) at the second terminal 32 of the light-emitting module 3, because the driving current generation module 4 is connected between the second terminal 32 of the light-emitting module 3 and ground. The channel voltages (VCH1-VCH3) at the second terminals 32 of the light-emitting modules 3 are received by the brightness modulation module 5 as feedback.

The brightness modulation module 5 is configured to receive a brightness value, and configured to, with respect to each of the driving current generation modules 4, generate the periodic switch signal and the magnitude control signal, and output the periodic switch signal and the magnitude control signal to the driving current generation module 4. According to some embodiments, when the light-emitting system including the driving system 1 is powered on or when the brightness value has been changed, the periodic switch signal generated by the brightness modulation module 5 may have a predetermined initial duty cycle, and the magnitude control signal may indicate a predetermined current magnitude, wherein the initial duty cycle and the current magnitude are determined based on the brightness value so that a product of the initial duty cycle and the initial current magnitude equals the brightness value.

The brightness modulation module 5 is further configured to, with respect to each of the driving current generation modules 4, compare the channel voltage (VCH1/VCH2/VCH3) provided at the second terminal 32 of the corresponding one of the light-emitting modules 3 with a reference voltage, and modulate the magnitude control signal and the periodic switch signal based on a result of the comparison. The reference voltage is related to a minimum working voltage that the driving current generation modules 4 requires for generating a driving current with a predetermined magnitude, wherein the predetermined magnitude is a rated current magnitude of the LEDs 33 of the light-emitting modules 31. The reference voltage is predetermined. According to some embodiments, the reference voltage may be slightly greater than the minimum working voltage.

Specifically, when it is determined that the channel voltage (VCH1/VCH2/VCH3) exceeds the reference voltage in magnitude, the brightness modulation module 5 modulates the magnitude control signal by increasing the current magnitude indicated by the magnitude control signal, and modulates the periodic switch signal by decreasing the duty cycle of the periodic switch signal, so that a product of the duty cycle of the periodic switch signal and the current magnitude indicated by the magnitude control signal is substantially kept unchanged and substantially equal to the brightness value that the brightness modulation module 5 received. The product is ideally equal to the brightness value. However, in practice, the duty cycle and the current magnitude have least adjustment units of calibration, and the product of the ultimate duty cycle and the ultimate current magnitude may not exactly be equal to the brightness value.

Because the working voltage of the light-emitting module 3 is positively correlated to the magnitude of the driving current flowing therethrough, the magnitude of the channel voltage (VCH1/VCH2/VCH3) decreases as the magnitude of the driving current increases, wherein, the channel voltage has a magnitude equal to the magnitude of the supply voltage subtracted by a magnitude of the working voltage of the light-emitting module 3, and is equivalent to the working voltage of the driving current generation module 4 corresponding to the light-emitting module 3, and the driving current is equal to the current magnitude indicated by the magnitude control signal received by the driving current generation module 4.

Besides, the brightness of the light-emitting module 3 is determined by the magnitude of the driving current flowing therethrough (which is equal to the current magnitude indicated by the magnitude control signal) and the duty cycle of the switch 41 of the driving current generation module 4 (which is equal to the duty cycle of the periodic switch signal). Therefore, by the brightness modulation module 5 modulating the magnitude control signal and the periodic switch signal in such a way that the current magnitude is decreased while the product of the duty cycle and the current magnitude is kept unchanged, the driving system 1 may reduce the power consumed by the driving current generation module 4 and reduce the heat generated by the driving current generation module 4 while keeping the light-emitting module 3 at a desired brightness.

Figure 3:
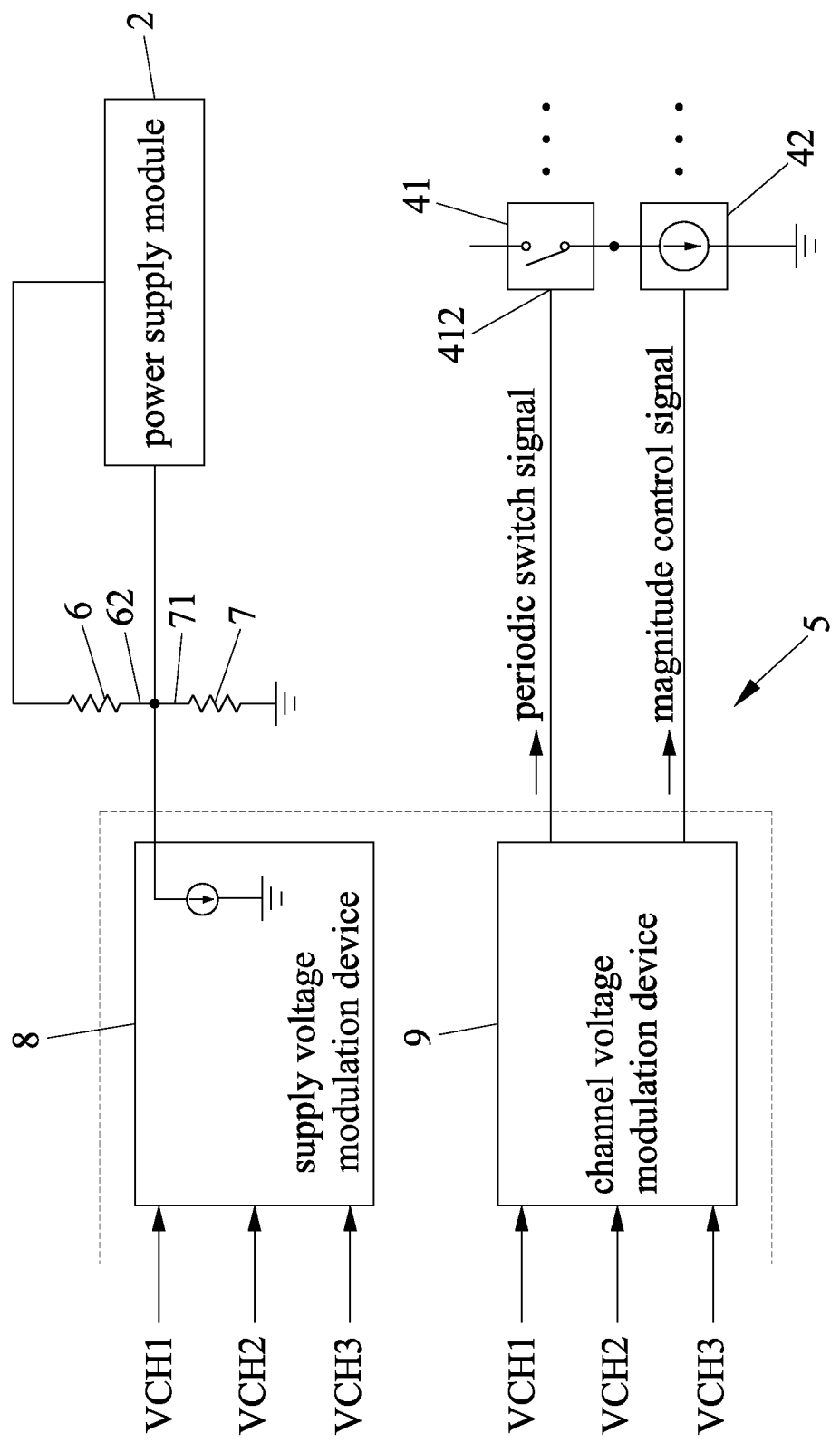
FIG. 3 is a schematic diagram that exemplarily illustrates a brightness modulation module of the light-emitting system according to an embodiment of the disclosure.

FIG. 3 exemplarily illustrates an inner structure of the brightness modulation module 5 according to an embodiment of the disclosure. Referring to FIGS. 2 and 3, the brightness modulation module 5 includes a supply voltage modulation device 8 and a channel voltage modulation device 9. The channel voltage modulation device 9 is adapted to receive the brightness value. Both of the supply voltage modulation device 8 and the channel voltage modulation device 9 are electrically connected to the second terminals 32 of the light-emitting modules 3 to receive the channel voltages (VCH1-VCH3) provided at the second terminals 32. The supply voltage modulation device 8 is further electrically connected to the second terminal 62 of the first resistor 6. The channel voltage modulation device 9 is further electrically connected to the control terminals 412 of the switches 41 to provide the periodic switch signals to the control terminals 412 of the switches 41, and electrically connected to the current sources 42 to provide the magnitude control signals to the current sources 42.

Figure 4:
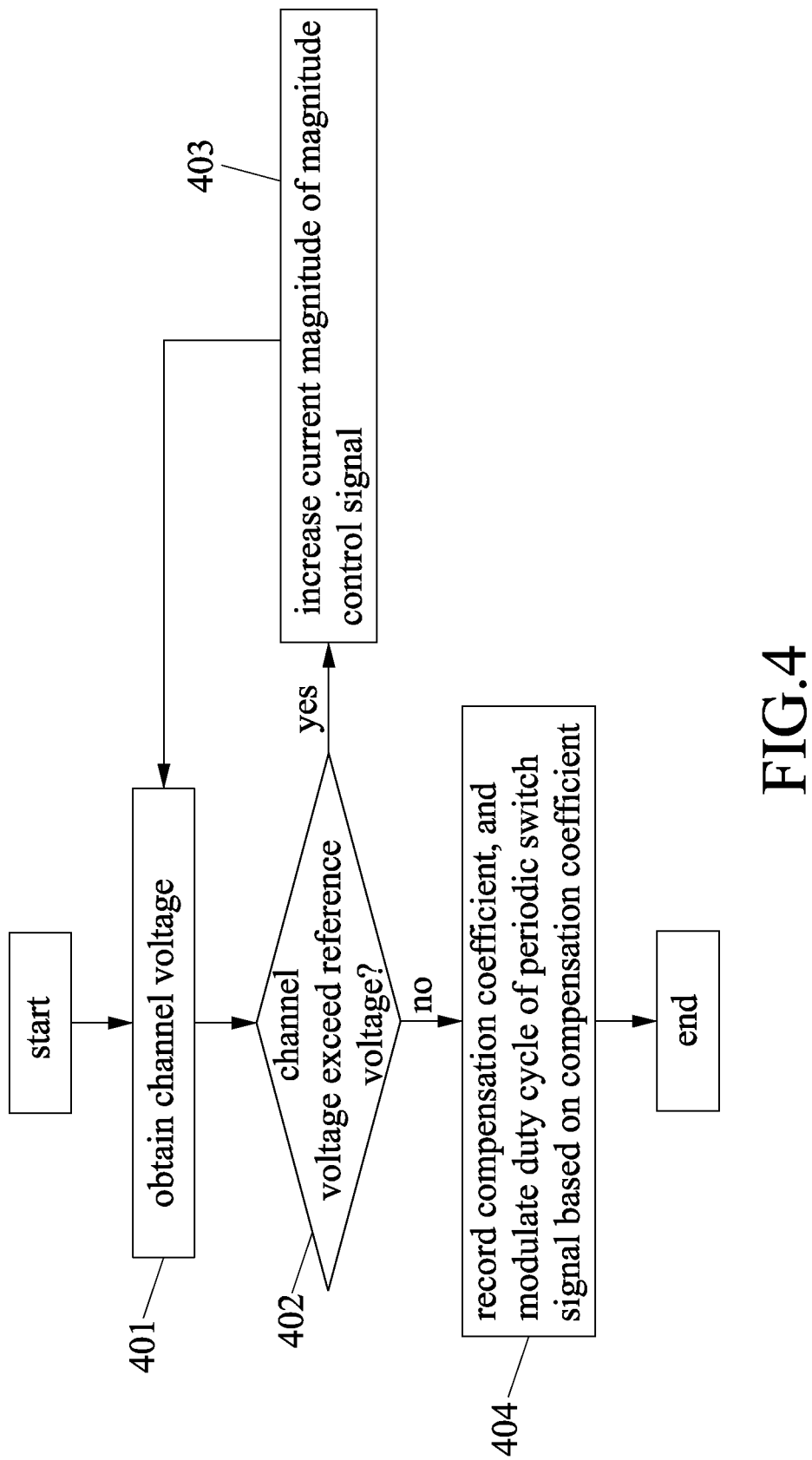
FIG. 4 is a flow chart that exemplarily illustrates a channel voltage modulation procedure according to an embodiment of the disclosure.

The channel voltage modulation device 9 is configured to perform a channel voltage modulation procedure for adjusting the channel voltages (VCH1-VCH3) provided at the second terminals 32 of the light-emitting modules 3. The procedure is to be performed with respect to each of said driving current generation modules 4. FIG. 4 exemplarily illustrates the channel voltage modulation procedure. Referring to FIGS. 2-4, the procedure includes Steps 401-404.

In Step 401, the channel voltage modulation device 9 obtains the channel voltage (VCH1/VCH2/VCH3) provided at the second terminal 32 of the corresponding light-emitting module 3.

In Step 402, the channel voltage modulation device 9 compares the channel voltage (VCH1/VCH2/VCH3) with the reference voltage to determine whether the channel voltage (VCH1/VCH2/VCH3) exceeds the reference voltage in magnitude. If so, the process goes to Step 403; otherwise, the process goes to Step 404.

In Step 403, the channel voltage modulation device 9 modulates the magnitude control signal to be sent to the driving current generation module 4 in such a way that the current magnitude indicated by the magnitude control signal is increased. Then, the process returns to Step 401.

In Step 404, the channel voltage modulation device 9 records a compensation coefficient that is a ratio of a present value of the current magnitude indicated by the magnitude control signal to an initial value of the current magnitude. The present value is the value that the current magnitude indicated by the magnitude control signal currently has. The initial value is the value that the current magnitude indicated by the magnitude control signal previously had when its value had never been increased, i.e., the initial current magnitude. Moreover, in a case where the compensation coefficient thus recorded is not equal to one, the channel voltage modulation device 9 modulates the duty cycle of the periodic switch signal to be sent to the driving current generation module 4 based on the compensation coefficient thus recorded, such that the product of the present value of the current magnitude indicated by the magnitude control signal and a present value of the duty cycle of the periodic switch signal (i.e., the value that the duty cycle of the periodic switch signal currently has) remains substantially equal to the brightness value.

Figure 5:
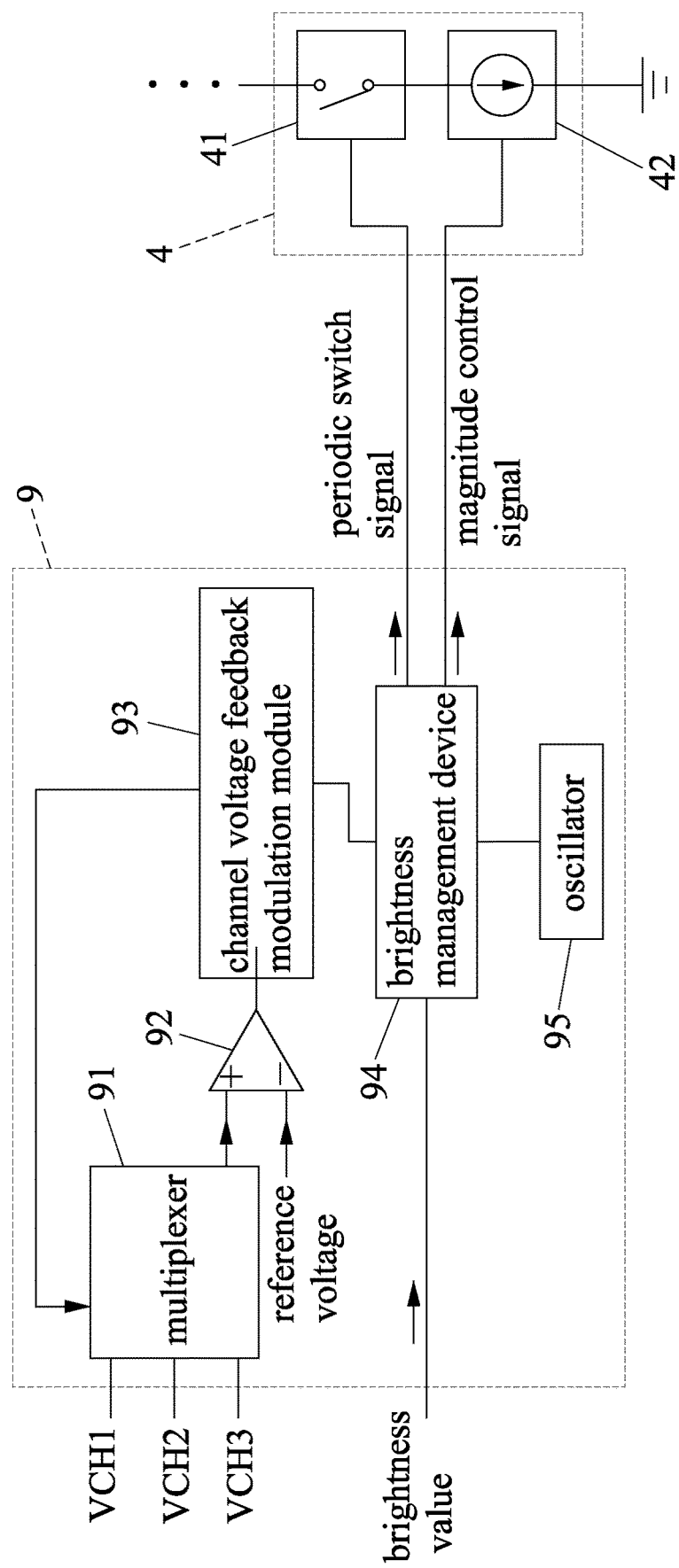
FIG. 5 is a schematic diagram that exemplarily illustrates a channel voltage modulation device of the light-emitting system according to an embodiment of the disclosure.

FIG. 5 exemplarily illustrates a circuit of the channel voltage modulation device 9 according to an embodiment of the disclosure. Referring to FIGS. 2 and 5, the channel voltage modulation device 9 includes a multiplexer 91, a comparator 92, a channel voltage feedback modulation module 93, a brightness management device 94 and an oscillator 95.

The multiplexer 91 is electrically connected to the second terminals 32 of the light-emitting modules 3 to receive the channel voltages (VCH1-VCH3) respectively provided at the second terminals 32, and receives a selection signal that is related to one of the driving current generation modules 4 (also referred to as "indicated driving current generation module 4" hereinafter). The multiplexer 91 is configured to output one of the channel voltages (VCH1-VCH3) that is provided at the second terminal 32 of the light-emitting module 3 that corresponds to the indicated driving current generation module 4 to serve as a selected channel voltage.

The comparator 92 is electrically connected to the multiplexer 91 to receive the selected channel voltage, and is adapted to receive the reference voltage. The comparator 92 is configured to provide a comparison result by comparing the selected channel voltage with the reference voltage.

The channel voltage feedback modulation module 93 is electrically connected to the comparator 92 to receive the comparison result, and is electrically connected to the multiplexer 91 to provide the selection signal to the multiplexer 91. The channel voltage feedback modulation module 93 is also electrically connected to the brightness management device 94 to output an output signal to the brightness management device 94. The channel voltage feedback modulation module 93 is configured to generate the output signal based on the comparison result and on which driving current generation module 4 is related to the selection signal (i.e., the indicated driving current generation module 4). Specifically, when the channel voltage feedback modulation module 93 receives the comparison result indicating that the selected channel voltage exceeds the reference voltage in magnitude, the channel voltage feedback modulation module 93 generates the output signal to instruct the brightness management device 94 to increase the current magnitude indicated by the magnitude control signal that is to be outputted to the indicated driving current generation module 4; otherwise, the channel voltage feedback modulation module 93 generates the output signal to instruct the brightness management device 94 to maintain the current magnitude of the magnitude control signal and modulate the duty cycle of the periodic switch signal to be outputted to the indicated driving current generation module 4. In some embodiments, when receiving the comparison result indicating that the selected channel voltage exceeds the reference voltage in magnitude, the channel voltage feedback modulation module 93 instructs the brightness management device 94 to increase the current magnitude by a predetermined increment (e.g., 1% of the initial value of the current magnitude). After generating the output signal to instruct the brightness management device 94 to modulate the duty cycle of the periodic switch signal that is to be outputted to the indicated driving current generation module 4, the channel voltage feedback modulation module 93 updates the selection signal to indicate another driving current generation module 4, and outputs the selection signal thus updated to the multiplexer 91. According to some embodiments, the channel voltage feedback modulation module 93 may be implemented by a logic circuit that includes a counter.

The brightness management device 94 is adapted to receive the brightness value, and is electrically connected to the oscillator 95 that provides a clock signal. The brightness management device 94 is configured to operate based on the clock signal received from the oscillator 95, and is also configured to generate and modulate the periodic switch signal and the magnitude control signal that are to be outputted to the indicated driving current generation module 4 based on the brightness value and the output signal received from the channel voltage feedback modulation module 93. Although only one driving current generation module 4 representing the indicated driving current generation module 4 is shown in FIG. 5, the brightness management device 94 is electrically connected to each of the driving current generation modules 4 of the driving system 1 in the same way. Specifically, when receiving the output signal with instructions to increase the current magnitude, the brightness management device 94 modulates the magnitude control signal by increasing the current magnitude indicated by the magnitude control signal. When receiving the output signal with instructions to maintain the current magnitude and modulate the duty cycle, the brightness management device 94 keeps the magnitude control signal unchanged so as to maintain the current magnitude indicated by the magnitude control signal, records the compensation coefficient, maintains the duty cycle of the periodic switch signal in a case where the compensation coefficient is equal to one, and decreases the duty cycle of the periodic switch signal in a case where the compensation coefficient is not equal to one. That is, when the compensation coefficient has a CV value greater than one (i.e., the brightness management device 94 increases the current magnitude to be a product of the initial value of the current magnitude and a multiplier of the CV value greater than one), the duty cycle is decreased to be a product of an initial value of the duty cycle (i.e., the initial duty cycle) and a factor of 1/CV. According to some embodiments, when the brightness value has been changed or when the driving system 1 is restarted, the compensation coefficient recorded for the driving current generation module 4 may be readily utilized to determine the initial value of the current magnitude indicated by the magnitude control signal and the initial value of the duty cycle of the periodic switch signal that are to be provided to the driving current generation module 4.

As mentioned before, the magnitude of the channel voltage (VCH1/VCH2/VCH3) at the second terminal 32 of the light-emitting module 3 is negatively correlated to the magnitude of the driving current generated by the corresponding driving current generation module 4 that is equal to the current magnitude indicated by the magnitude control signal received by the corresponding driving current generation module 4. Therefore, by the channel voltage modulation device 9 modulating the current magnitudes indicated by the magnitude control signals that are to be sent to the driving current generation modules 4 in the way stated above, the channel voltages (VCH1-VCH3) at the second terminals 32 of the light-emitting module 3 may reach a steady magnitude that equals the magnitude of the reference voltage or slightly below the magnitude of the reference voltage, so that each of the driving current generation modules 4 operates at a proper voltage that has a magnitude which does not exceed or only slightly exceeds the minimum working voltage that is sufficient for the driving current generation module 4 to operate normally.

Figure 6:
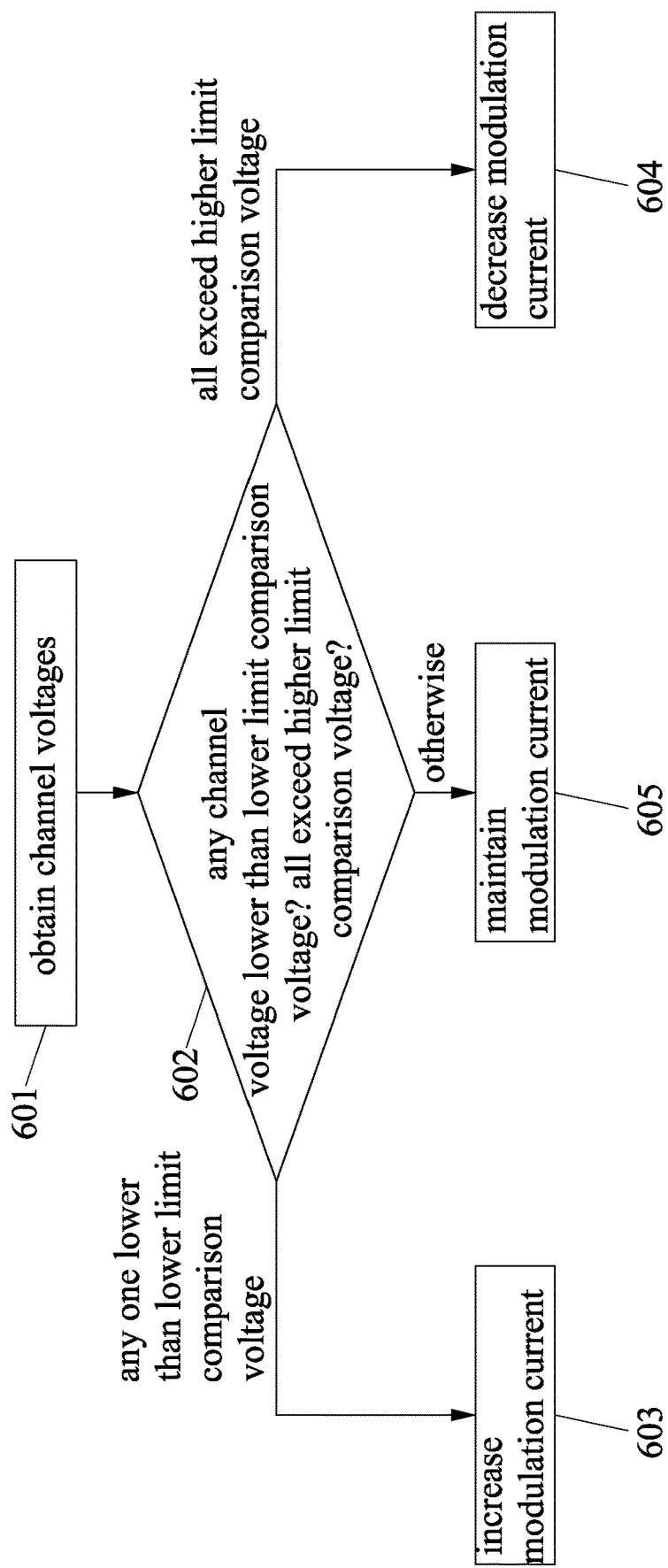
FIG. 6 is a flow chart that exemplarily illustrates a supply voltage adjustment procedure according to an embodiment of the disclosure.

Referring to FIGS. 2, 3 and 6, the supply voltage modulation device 8 of the brightness modulation module 5 is configured to periodically perform a supply voltage adjustment procedure for adjusting the supply voltage provided by the power supply module 2. FIG. 6 exemplarily illustrates the supply voltage adjustment procedure that includes Steps 601-605.

In Step 601, the supply voltage modulation device 8 obtains the channel voltages (VCH1-VCH3) respectively provided at the second terminals 32 of the light-emitting modules 3.

In Step 602, the supply voltage modulation device 8 compares the channel voltages (VCH1-VCH3) with a lower limit comparison voltage, in order to determine whether any of the channel voltages (VCH1-VCH3) is lower than the lower limit comparison voltage in magnitude. The supply voltage modulation device 8 further compares the channel voltages (VCH1-VCH3) with a higher limit comparison voltage, in order to determine whether the channel voltages (VCH1-VCH3) all exceed the higher limit comparison voltage in magnitude. If any of the channel voltages (VCH1-VCH3) is lower than the lower limit comparison voltage in magnitude, the process goes to Step 603. If the channel voltages (VCH1-VCH3) all exceed the higher limit comparison voltage in magnitude, the process goes to Step 604. If none of the channel voltages (VCH1-VCH3) is lower than the lower limit comparison voltage in magnitude and if not all of the channel voltages (VCH1-VCH3) exceed the higher limit comparison voltage in magnitude, the process goes to Step 605. The lower limit comparison voltage and the higher limit comparison voltage are predetermined. According to some embodiments, the lower limit comparison voltage has a magnitude that is equal to a magnitude of the minimum working voltage, and the higher limit comparison voltage has a magnitude that is greater than a sum of the magnitude of the lower limit working voltage and a least adjustment unit of the magnitude of the supply voltage, and is smaller than a rated voltage magnitude of the driving current generation modules 4.

In Step 603, the supply voltage modulation device 8 controls the power supply module 2 to increase the magnitude of the supply voltage by increasing a magnitude of a modulation current that is generated by the supply voltage modulation device 8 and that flows through the first resistor 6. The resultant increment in the magnitude of the supply voltage is less than a magnitude difference between the higher limit comparison voltage and the lower limit comparison voltage. Details of how the supply voltage modulation device 8 controls the power supply module 2 will be described later.

In Step 604, the supply voltage modulation device 8 controls the power supply module 2 to decrease the magnitude of the supply voltage by decreasing the magnitude of the modulation current.

In Step 605, the supply voltage modulation device 8 controls the power supply module 2 to maintain the magnitude of the supply voltage by not changing the magnitude of the modulation current.

Figure 7:
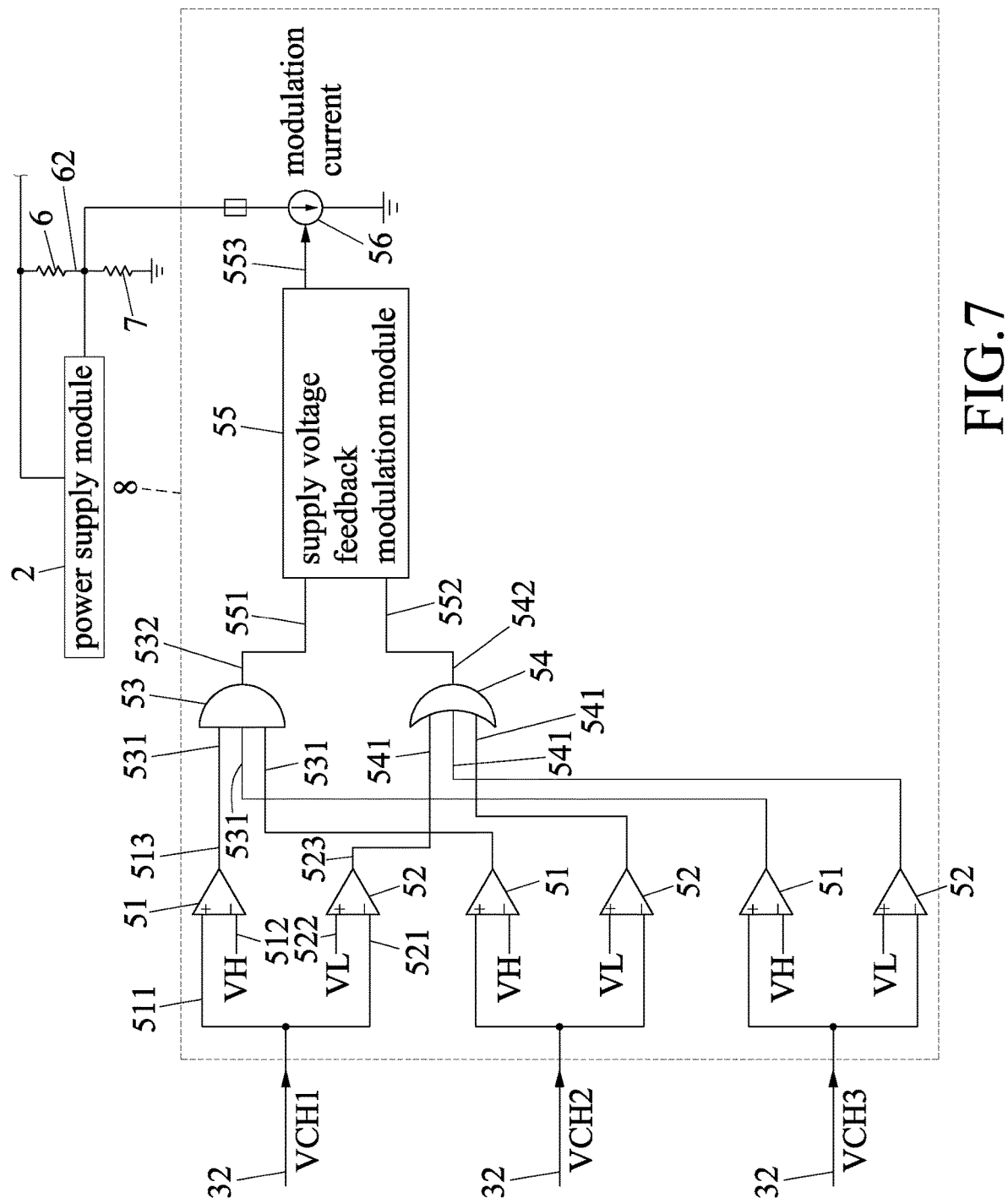
FIG. 7 is a schematic diagram that exemplarily illustrates a supply voltage modulation device of the light-emitting system according to an embodiment of the disclosure.

FIG. 7 exemplarily illustrates a circuit of the supply voltage modulation device 8 according to an embodiment of the disclosure. Referring to FIGS. 2 and 7, the supply voltage modulation device 8 includes a number N (which is three in the embodiment illustrated in FIG. 7 in correspondence with the embodiment shown in FIG. 2) of higher level comparators 51 corresponding respectively to the light-emitting modules 3, a number N of lower level comparators 52 corresponding respectively to the light-emitting modules 3, a first logic gate 53, a second logic gate 54, a supply voltage feedback modulation module 55 and a current source 56.

The current source 56 has two terminals, one of which is electrically connected to the second terminal 62 of the first resistor 6, and the other of which is connected to ground. The current source 56 is configured to generate the modulation current to control the power supply module 2 to thereby modulate the magnitude of the supply voltage.

Each higher level comparator 51 has a non-inverting input terminal 511 that is electrically connected to the second terminal 32 of the corresponding light-emitting module 3 to receive the channel voltage (VCH1/VCH2/VCH3) provided at the second terminal 32, an inverting input terminal 512 adapted to receive the higher limit comparison voltage (denoted as VH in FIG. 7), and an output terminal 513. When receiving the channel voltage (VCH1/VCH2/VCH3) that is higher than the higher limit comparison voltage (VH) in magnitude, the higher level comparator 51 outputs logical one at the output terminal 513 thereof; in the contrary situation, the higher level comparator 51 outputs logical zero at the output terminal 513 thereof.

Each lower level comparator 52 has an inverting input terminal 521 that is electrically connected to the second terminal 32 of the corresponding light-emitting module 3 to receive the channel voltage (VCH1/VCH2/VCH3) provided at the second terminal 32, a non-inverting input terminal 522 adapted to receive the lower limit comparison voltage (denoted as VL in FIG. 7), and an output terminal 523. When receiving the channel voltage (VCH1/VCH2/VCH3) that is lower than the lower limit comparison voltage (VL) in magnitude, the lower level comparator 52 outputs logical one at the output terminal 523 thereof; in the contrary situation, the lower level comparator 52 outputs logical zero at the output terminal 523 thereof.

The first logic gate 53 is an AND gate that has an output terminal 532, and a number N of input terminals 531 that are electrically connected to the output terminals 513 of the higher level comparators 51, respectively. When the input terminals 531 all receive logical one (which means that all of the channel voltages (VCH1-VCH3) are higher than the higher limit comparison voltage (VH) in magnitude), the first logic gate 53 outputs logical one at the output terminal 532 thereof; otherwise, the first logic gate 53 outputs logical zero at the output terminal 532 thereof.

The second logic gate 54 is an OR gate that has an output terminal 542, and a number N of input terminals 541 that are electrically connected to the output terminals 523 of the lower level comparators 52, respectively. When any of the input terminals 541 receives logical one (which means that at least one of the channel voltages (VCH1-VCH3) is lower than the lower limit comparison voltage (VL) in magnitude), the second logic gate 54 outputs logical one at the output terminal 542 thereof; otherwise, the second logic gate 54 outputs logical zero at the output terminal 542 thereof.

The supply voltage feedback modulation module 55 has a first input terminal 551 electrically connected to the output terminal 532 of the first logic gate 53, a second input terminal 552 electrically connected to the output terminal 542 of the second logic gate 54, and an output terminal 553 electrically connected to the current source 56. In an embodiment, the supply voltage feedback modulation module 55 is an up-down counter. The supply voltage feedback modulation module 55 is configured to generate a control signal at the output terminal 553 to control the current source 56 to modulate the magnitude of the modulation current.

When not all of the channel voltages (VCH1-VCH3) are higher than the higher limit comparison voltage (VH) in magnitude and none of the channel voltages (VCH1-VCH3) is lower than the lower limit comparison voltage (VL) in magnitude, the supply voltage feedback modulation module 55 receives logical zero at both of its first and second input terminals 551, 552, and maintains a value represented by the control signal so as to instruct the current source 56 to maintain (i.e., not change) the magnitude of the modulation current generated by the current source 56. Therefore, the magnitude of the supply voltage provided by the power supply module 2 is kept unchanged. How the magnitude of the modulation current affects the magnitude of the supply voltage will be described later.

When any of the channel voltages (VCH1-VCH3) is lower than the lower limit comparison voltage (VL) in magnitude (in this situation, certainly not all of the channel voltages (VCH1-VCH3) are higher than the higher limit comparison voltage (VH) in magnitude), the supply voltage feedback modulation module 55 receives logical zero at its first input terminal 551, receives logical one at its second input terminal 552, and increments the value represented by the control signal by one, for example, so as to instruct the current source 56 to increase the magnitude of the modulation current by, for example, one unit. Therefore, the magnitude of the supply voltage is increased.

When all of the channel voltages (VCH1-VCH3) are higher than the higher limit comparison voltage (VH) in magnitude (in this situation, certainly none of the channel voltages (VCH1-VCH3) are lower than the lower limit comparison voltage (VL) in magnitude), the supply voltage feedback modulation module 55 receives logical one at its first input terminal 551, receives logical zero at its second input terminal 552, and decrements the value represented by the control signal by one, for example, so as to instruct the current source 56 to reduce the magnitude of the modulation current by, for example, one unit. Therefore, the magnitude of the supply voltage is decreased.

Figure 8:
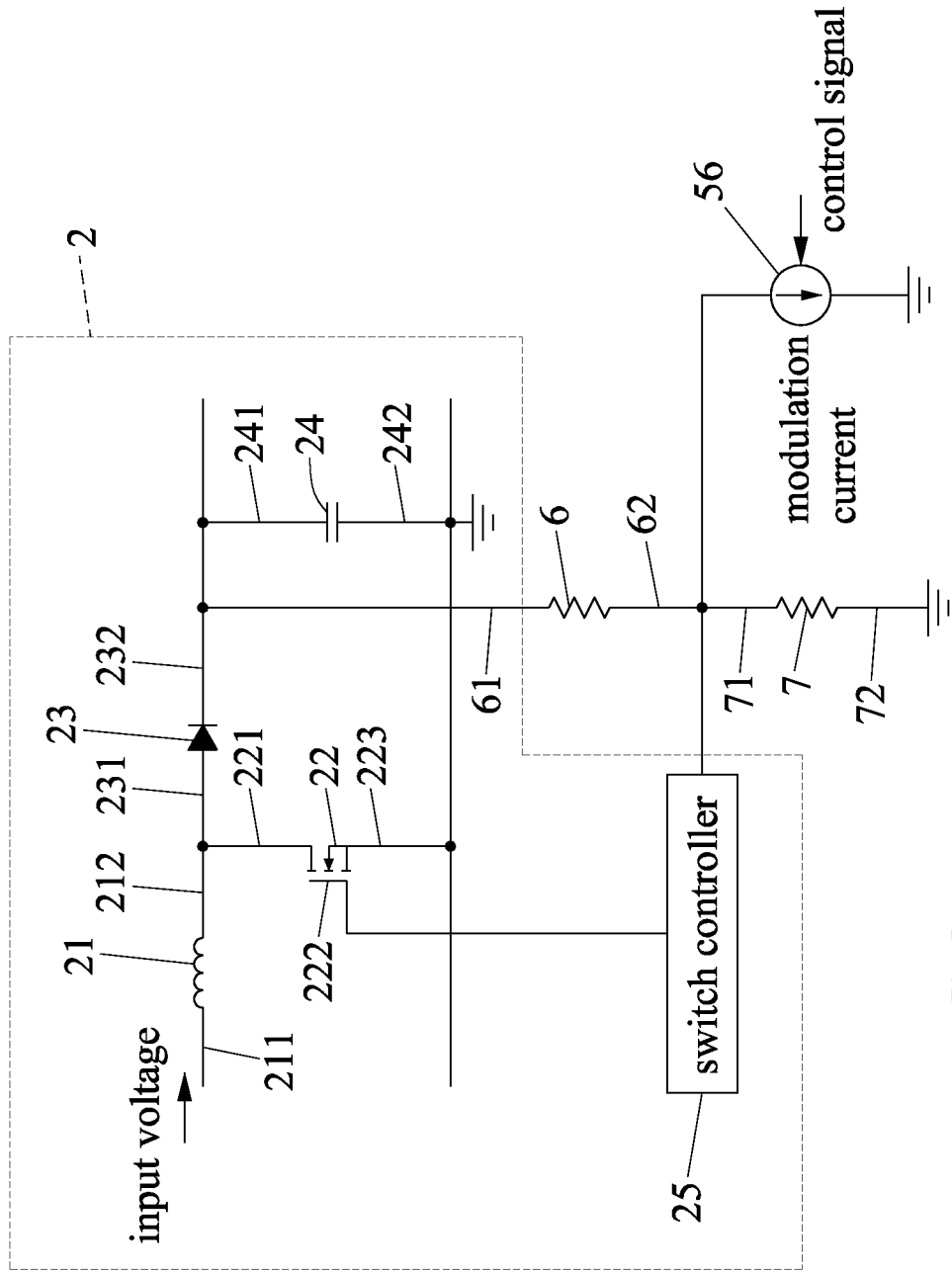
FIG. 8 is a schematic diagram that exemplarily illustrates a power supply module of the light-emitting system according to an embodiment of the disclosure.

The power supply module 2 is configured to receive an input voltage, and output the supply voltage that has a magnitude corresponding to the magnitude of the modulation current. FIG. 8 exemplarily illustrates a circuit of the power supply module 2 according to an embodiment of the disclosure. The current source 56 of the supply voltage modulation device 8, the first resistor 6 and the second resistor 7 are also shown in FIG. 8.

Referring to FIG. 8, the power supply module 2 includes a boost inductor 21, a switch 22, a boost diode 23, an output capacitor 24 and a switch controller 25. The boost inductor 21 includes a first terminal 211 adapted to receive the input voltage, and a second terminal 212. The switch 22 includes a first terminal 221 electrically connected to the second terminal 212 of the boost inductor 21, a control terminal 222, and a second terminal 223 electrically connected to ground. In the embodiment illustrated in FIG. 8, the switch 22 is implemented by a transistor.

The boost diode 23 includes an anode terminal 231 electrically connected to the second terminal 212 of the boost inductor 21, and a cathode terminal 232. The output capacitor 24 includes a first terminal 241 and a second terminal 242, wherein the first terminal 241 provides the supply voltage and is electrically connected to the cathode terminal 232 of the boost diode 23 and the first terminal 61 of the first resistor 6, and the second terminal 242 is electrically connected to ground.

The switch controller 25 is electrically connected to the second terminal 62 of the first resistor 6 to receive a feedback voltage that is provided at the second terminal 62 of the first resistor 6. The switch controller 25 is further electrically connected to the control terminal 222 of the switch 22 to control switching of the switch 22 between conduction and non-conduction, and is configured to modulate a duty cycle of the switch 22 based on the feedback voltage. Specifically, the switch controller 25 is configured to decrease the duty cycle of the switch 22 when the feedback voltage is greater than a set voltage in magnitude, and to increase the duty cycle of the switch 22 when the feedback voltage is smaller than the set voltage in magnitude. According to some embodiments, the switch controller 25 may be implemented by a pulse width modulation (PWM) controller.

Because the current flowing through the first resistor 6 is a sum of the modulation current generated by the current source 56 and a current flowing through the second resistor 7, the voltage at the first terminal 61 of the first resistor 6 is the supply voltage, and the voltage at the second terminal 72 of the second resistor 7 has a zero magnitude, the feedback voltage can be derived by the following equation:

$$V_{FB} = \frac{R_2 \times (V_{out} - R_1 \times I_{FBO})}{R_1 + R_2},$$

wherein $V_{out}$ is the supply voltage, $V_{FB}$ the feedback voltage, $R_1$ is a resistance of the first resistor 6, $R_2$ is a resistance of the second resistor 7, and $I_{FBO}$ is the modulation current.

It can be seen that the magnitude of the feedback voltage is negatively correlated to the magnitude of the modulation current. By the switch controller 25 decreasing the duty cycle of the switch 22 when the feedback voltage is greater than the set voltage in magnitude and increasing the duty cycle of the switch 22 when the feedback voltage is smaller than the set voltage in magnitude, the supply voltage would be stabilized at $$V_{SET} \times \left(1 + \frac{R_1}{R_2}\right) + R_1 \times I_{FBO},$$

where $V_{SET}$ is the set voltage. In this way, the magnitude of the supply voltage is controlled by the supply voltage modulation device 8 modulating the magnitude of the modulation current.

Referring to FIGS. 2, 7 and 8, by the supply voltage modulation device 8 adjusting the modulation current based on the channel voltages (VCH1-VCH3) provided at the second terminals 32 of the light-emitting modules 3 in the way described above, and by the power supply module 2 adjusting the supply voltage based on the feedback voltage in correspondence with the modulation current in the way described above, the supply voltage provided by the power supply module 2 will reach a steady state that is approximately equal to a highest one of the required working voltages of the light-emitting modules 3 plus the minimum working voltage for the driving current generation modules 4 to operate normally.

For example, in an embodiment where the minimum working voltage for the driving current generation modules 4 is 0.5 volts, a highest one of the required working voltages of the light-emitting modules 3 is 32 volts, another one of the required working voltages of the light-emitting modules 3 is 30 volts, and the brightness modulation module 5 initially generates magnitude control signals indicating an initial current magnitude of 30 mA and periodic switch signals having an initial duty cycle with a value IDC that is determined based on the brightness value and the initial current magnitude, the power supply module 2 would, in this case, provide a supply voltage of 32.5 volts. After modulation by the brightness modulation module 5, the current that is to be provided to the light-emitting module 3 having the another required working voltage of 30 volts, and that is generated by the current source 42 of the driving current generation module 4 corresponding to said light-emitting module 3, is increased to have an ultimate magnitude that is over 30 mA and that results in said light-emitting module 3 having a 32-volt working voltage, so that the working voltage of the driving current generation module 4 corresponding to said light-emitting module 3 is 0.5 volts, rather than 2.5 volts which is what the working voltage of the driving current generation module 4 would be if the current source 42 of said current generation module 4 generated a 30-milliampere current and provided the 30-milliampere current to said light-emitting module 3. In this embodiment, the ultimate current generated by the current source 42 of said driving current generation module 4 is 33 milliampere, resulting in a compensation coefficient CV of 1.1, and the ultimate duty cycle that said driving current generation module 4 has is the initial duty cycle IDC divided by the compensation coefficient of 1.1 for said light-emitting module 3 to maintain its brightness. Said driving current generation module 4 operating at 0.5 volts consumes power according to the formula 0.5V×33 mA×(IDC/1.1). If operating at 2.5 volts, said driving current generation module 4 would consume power according to the formula 2.5V×30 mA×IDC. It can be seen that the former consumed power is eighty percent smaller than the later consumed power. It can be appreciated that the disclosed driving system 1 may effectively save the power consumed by said driving current generation module 4, and avoid the risk of said driving current generation module 4 overheating.

Figure 9:
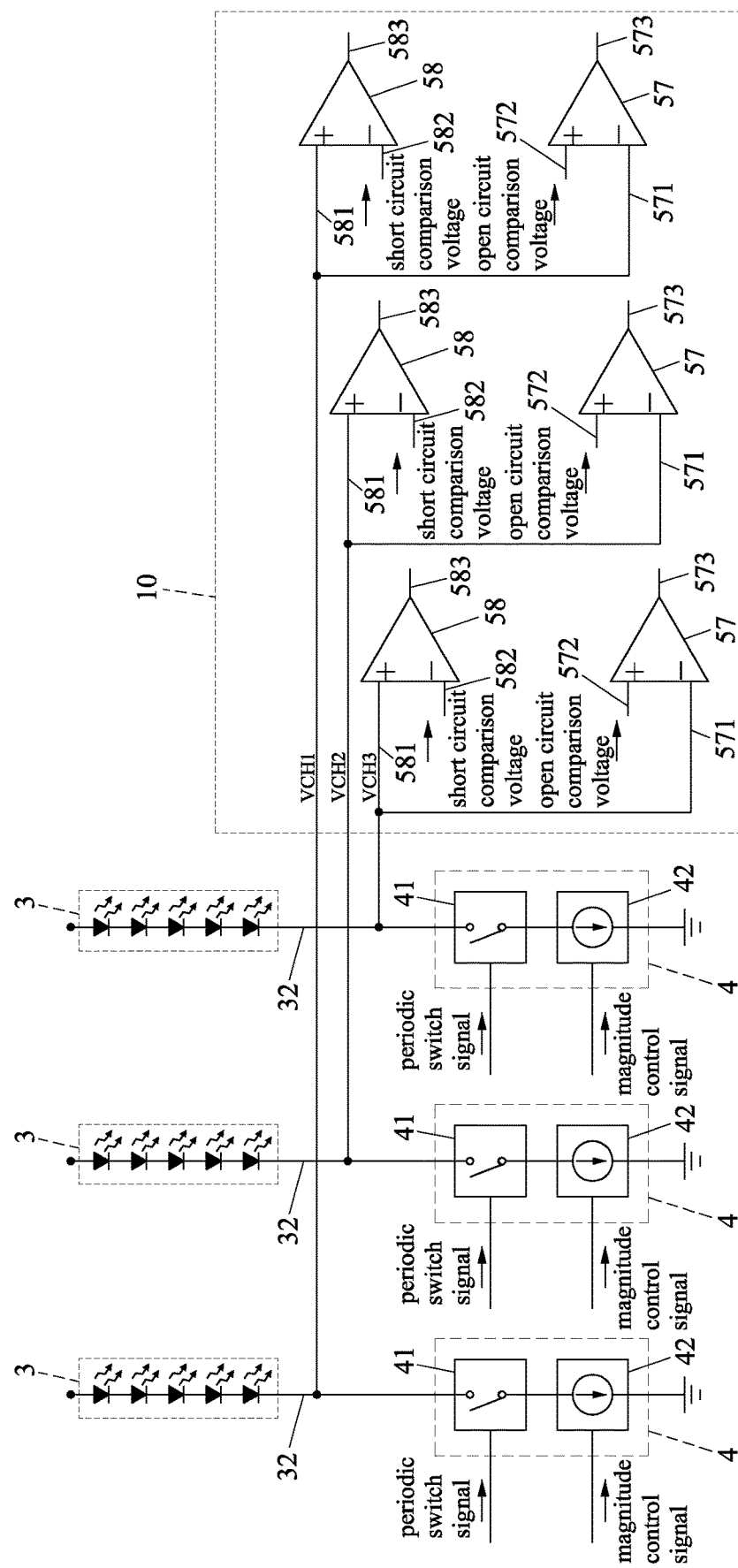
FIG. 9 is a schematic diagram that exemplarily illustrates a failure determination circuit of the light-emitting system according to an embodiment of the disclosure.

According to some embodiments, the driving system 1 may further include a failure determination circuit 10 that is configured to detect failure of the light-emitting modules 3 and that is exemplarily illustrated in FIG. 9. Referring to FIG. 9, the failure determination circuit 10 is electrically connected to each of the second terminals 32 of the light-emitting modules 3 to receive the channel voltages (VCH1-VCH3) respectively provided at the second terminals 32, and is adapted to receive an open circuit comparison voltage and a short circuit comparison voltage. Continuing with the embodiment shown in FIG. 2, three light-emitting modules 3 and three driving current generation modules 4 are illustrated in FIG. 9, but the disclosure is not limited thereto.

The failure determination circuit 10 is configured to, for each of the channel voltages (VCH1-VCH3) received from the second terminals 32 of the light-emitting modules 3, compare the channel voltage (VCH1/VCH2/VCH3) with the open circuit comparison voltage and with the short circuit comparison voltage. The failure determination circuit 10 is configured to, when the channel voltage (VCH1/VCH2/VCH3) is determined to be lower than the open circuit comparison voltage in magnitude, output an open circuit failure signal indicating that the light-emitting module 3 having the second terminal 32 from which the channel voltage (VCH1/VCH2/VCH3) is received is in an open circuit state. The failure determination circuit 10 is configured to output, when the channel voltage (VCH1/VCH2/VCH3) is determined to be higher than the short circuit comparison voltage in magnitude, a short circuit failure signal indicating that the light-emitting module 3 having the second terminal 32 from which the channel voltage (VCH1/VCH2/VCH3) is received is in a short circuit state. The open circuit comparison voltage is lower than the lower limit comparison voltage in magnitude. The short circuit comparison voltage is higher than the higher limit comparison voltage in magnitude.

The failure determination circuit 10 includes a number N of open circuit comparators 57 corresponding respectively to the light-emitting modules 3 and a number N of short circuit comparators 58 corresponding respectively to the light-emitting modules 3.

The open circuit comparators 57 each have an inverting input terminal 571, a non-inverting input terminal 572 and an output terminal 573. The inverting input terminal 571 is electrically connected to the second terminal 32 of the light-emitting module 3 corresponding to the open circuit comparator 57 to receive the channel voltage (VCH1/VCH2/VCH3) provided at the second terminal 32. The non-inverting input terminal 572 is adapted to receive the open circuit comparison voltage. Each of the open circuit comparators 57 is configured to output logical one to serve as the open circuit failure signal at its output terminal 573 when the channel voltage (VCH1/VCH2/VCH3) received by the open circuit comparator 57 is lower than the open circuit comparison voltage in magnitude, and output logical zero at its output terminal 573 otherwise. The output terminal 573 may be connected to a microcontroller unit (MCU) to deliver the open circuit failure signal thereto in order to facilitate a user monitoring or managing the operation of the light-emitting system.

The short circuit comparators 58 each have a non-inverting input terminal 581, an inverting input terminal 582 and an output terminal 583. The non-inverting input terminal 581 is electrically connected to the second terminal 32 of the light-emitting module 3 corresponding to the short circuit comparator 58 to receive the channel voltage (VCH1/VCH2/VCH3) provided at the second terminal 32. The inverting input terminal 582 is adapted to receive the short circuit comparison voltage. Each of the short circuit comparators 58 is configured to output logical one to serve as the short circuit failure signal at its output terminal 583 when the channel voltage (VCH1/VCH2/VCH3) received by the short circuit comparator 58 is higher than the short circuit comparison voltage in magnitude, and output logical zero at its output terminal 583 otherwise. The output terminal 573 may be connected to the MCU to deliver the short circuit failure signal thereto.

When the LEDs of any light-emitting module 3 are short-circuited, the channel voltage (VCH1/VCH2/VCH3) provided at the second terminal 32 of the light-emitting module 3 would be substantially increased to be approximate to the supply voltage. By the short circuit comparator 58 corresponding to the light-emitting module 3 comparing the short circuit comparison voltage with the channel voltage (VCH1/VCH2/VCH3) received from the second terminal 32 of the light-emitting module 3, the short circuit of the light-emitting module 3 can be detected.

When the LEDs of any light-emitting module 3 are open-circuited, the channel voltage (VCH1/VCH2/VCH3) provided at the second terminal 32 of the light-emitting module 3 would have a magnitude approximate to zero. By the open circuit comparator 57 corresponding to the light-emitting module 3 comparing the open circuit comparison voltage with the channel voltage (VCH1/VCH2/VCH3) received from the second terminal 32 of the light-emitting module 3, the open circuit situation of the light-emitting module 3 can be detected.

In summary, the disclosed light-emitting system is beneficial in that the driving currents flowing through the light-emitting modules 3 are modulated individually in such a way that the driving current generation modules 4 each operate at or proximately at the minimum working voltage while the brightness given by the light-emitting modules 3 is maintained at a desired level. The driving current generation modules 4 do not waste power, and do not suffer from the risk of overheating. Further, the light-emitting system which includes the failure determination circuit 10 is further beneficial in that failure situations of open circuit and short circuit in the light-emitting modules 3 can be detected.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A driving system for driving a number N of light-emitting modules that each have a first terminal for receiving a supply voltage and a second terminal, and that each, when a current flows therethrough, provide a working voltage thereacross having a magnitude positively correlated to a magnitude of the current, N being an integer that is no less than two, the driving system comprising:
   a number N of driving current generation modules corresponding respectively to the light-emitting modules, wherein with respect to each of said driving current generation modules, said driving current generation module is electrically connected between ground and the second terminal of the corresponding one of the light-emitting modules, and is configured to receive a periodic switch signal and a magnitude control signal, and to, when the periodic switch signal is at an active logic level, provide a driving current that has a magnitude equaling a current magnitude indicated by the magnitude control signal, and that flows through the corresponding one of the light-emitting modules so a channel voltage having a magnitude which equals subtracting the magnitude of the working voltage of the corresponding one of the light-emitting modules from a magnitude of the supply voltage is provided at the second terminal of the corresponding one of the light-emitting modules; and
   a brightness modulation module that is electrically connected to said current generation modules and the second terminals of the light-emitting modules, and that is configured to, with respect to each of said driving current generation modules,
      generate the periodic switch signal and the magnitude control signal to be sent to said driving current generation module, and output the periodic switch signal and the magnitude control signal to said driving current generation module,
      compare the channel voltage provided at the second terminal of the corresponding one of the light-emitting modules with a reference voltage, and
      when determining that the channel voltage exceeds the reference voltage in magnitude, modulate the magnitude control signal by increasing the current magnitude indicated by the magnitude control signal.

2. The driving system of claim 1, further comprising:
   a power supply module that is electrically connected to the first terminals of the light-emitting modules, and is configured to generate the supply voltage and output the supply voltage to the first terminals of the light-emitting modules.

3. The driving system of claim 2, wherein said brightness modulation module includes a supply voltage modulation device that is configured to:
   compare the channel voltages respectively provided at the second terminals of the light-emitting modules with a higher limit comparison voltage and with a lower limit comparison voltage, wherein the higher limit comparison voltage is larger than the lower limit comparison voltage in magnitude;
   when determining that any of the channel voltages is lower than the lower limit comparison voltage in magnitude, control said power supply module to increase the magnitude of the supply voltage; and
   when determining that the channel voltages all exceed the higher limit comparison voltage in magnitude, control said power supply module to decrease the magnitude of the supply voltage.

4. The driving system of claim 3, wherein:
   said supply voltage modulation device includes a number N of higher level comparators corresponding respectively to the light-emitting modules, a number N of lower level comparators corresponding respectively to the light-emitting modules, a first logic gate, a second logic gate, a supply voltage feedback modulation module and a current source;

with respect to each of said higher level comparators, said higher level comparator has a non-inverting input terminal that is electrically connected to the second terminal of the corresponding one of the light-emitting modules to receive the channel voltage provided at the second terminal, an inverting input terminal adapted to receive the higher limit comparison voltage, and an output terminal;

with respect to each of said lower level comparators, said lower level comparator has an inverting input terminal that is electrically connected to the second terminal of the corresponding one of the light-emitting modules to receive the channel voltage provided at the second terminal, a non-inverting input terminal adapted to receive the lower limit comparison voltage, and an output terminal;

said first logic gate has a number N of input terminals and an output terminal, wherein said input terminals are electrically connected to said output terminals of said higher level comparators, respectively;

said second logic gate has a number N of input terminals and an output terminal, wherein said input terminals are electrically connected to said output terminals of said lower level comparators, respectively;

said current source is electrically connected to said power supply module, and is configured to generate a modulation current to control said power supply module to modulate the magnitude of the supply voltage;

said supply voltage feedback modulation module has a first input terminal electrically connected to said output terminal of said first logic gate, a second input terminal electrically connected to said output terminal of said second logic gate, and an output terminal electrically connected to said current source, wherein said supply voltage feedback modulation module is configured to generate a control signal at said output terminal thereof to control said current source to modulate a magnitude of the modulation current;

said supply voltage modulation device is configured such that when a signal provided at said output terminal of said first logic gate indicates that said higher level comparators all output logical one at their respective output terminals, said supply voltage feedback modulation module modulates the control signal to reduce the magnitude of the modulation current, so as to reduce the magnitude of the supply voltage; and said supply voltage modulation device is configured such that when a signal provided at said output terminal of said second logic gate indicates that any of said lower level comparators outputs logical one at its output terminal, said supply voltage feedback modulation module modulates the control signal to increase the magnitude of the modulation current, so as to increase the magnitude of the supply voltage.

5. The driving system of claim 1, wherein said brightness modulation module includes a channel voltage modulation device that is configured to, with respect to each of said driving current generation modules, compare the channel voltage provided at the second terminal of the corresponding one of the light-emitting modules with the reference voltage, when determining that the channel voltage exceeds the reference voltage in magnitude, modulate the magnitude control signal to be sent to said driving current generation module in such a way that the current magnitude indicated by the magnitude control signal is increased; and when determining that the channel voltage does not exceed the reference voltage in magnitude, record a compensation coefficient that is a ratio of a present value of the current magnitude indicated by the magnitude control signal to an initial value of the current magnitude, wherein the present value is the value that the current magnitude indicated by the magnitude control signal currently has, and the initial value is the value that the current magnitude indicated by the magnitude control signal previously had when its value had never been increased, and modulate a duty cycle of the periodic switch signal to be sent to said driving current generation module based on the compensation coefficient thus recorded.

6. The driving system of claim 5, wherein:

said channel voltage modulation device includes a multiplexer electrically connected to the second terminals of the light-emitting modules, a comparator electrically connected to said multiplexer, a channel voltage feedback modulation module electrically connected to said multiplexer and said comparator, and a brightness management device electrically connected to said channel voltage feedback modulation module and said driving current generation modules;

said multiplexer is configured to receive the channel voltages respectively provided at the second terminals of the light-emitting modules and a selection signal that is related to one of said driving current generation modules, and to output one of the channel voltages that is provided at the second terminal of the light-emitting module that corresponds to the one of said driving current generation modules to serve as a selected channel voltage;

said comparator is configured to receive the selected channel voltage from said multiplexer, to receive the reference voltage, and to provide a comparison result by comparing the selected channel voltage with the reference voltage;

said channel voltage feedback modulation module is configured to receive the comparison result from said comparator, to provide the selection signal to said multiplexer, and to generate and output an output signal based on the comparison result and based on which one of said driving current generation modules is related to the selection signal; and said brightness management device is configured to generate the periodic switch signals and the magnitude control signals to be outputted to said driving current generation modules, to receive the output signal from said channel voltage feedback modulation module and a brightness value, and to modulate, based on the output signal and the brightness value, the periodic switch signal and the magnitude control signal that are to be outputted to said driving current generation module related to the selection signal.

7. The driving system of claim 1, further comprising:

a failure determination circuit that is adapted to receive an open circuit comparison voltage and a short circuit comparison voltage, is electrically connected to the second terminals of the light-emitting modules to receive the channel voltages respectively provided at the second terminals, and is configured to, with respect to each of said driving current generation modules, compare the channel voltage provided at the second terminal of the corresponding one of the light-emitting modules with the open circuit comparison voltage and with the short circuit comparison voltage;

when determining that the channel voltage is lower than the open circuit comparison voltage in magnitude, output an open circuit failure signal indicating that the corresponding one of the light-emitting modules is in an open circuit state; and when determining that the channel voltage is higher than the short circuit comparison voltage in magnitude, output a short circuit failure signal indicating that the corresponding one of the light-emitting modules is in a short circuit state.

8. A light-emitting system, comprising:
said driving system of claim 1; and
said number N of light-emitting modules that are electrically connected to said number N of driving current generation modules of said driving system, respectively, and that receive the supply voltage.

9. The light-emitting system of claim 8, further comprising:
a power supply module that is electrically connected to said first terminals of said light-emitting modules, and is configured to generate the supply voltage and output the supply voltage to said first terminals of said light-emitting modules.

10. The light-emitting system of claim 9, wherein, with respect to each of said driving current generation modules, said brightness modulation module, when determining that the channel voltage provided at said second terminal of the corresponding one of said light-emitting modules exceeds the reference voltage in magnitude, is to modulate the periodic switch signal to be sent to said driving current generation module by decreasing the duty cycle of the periodic switch signal, so that a product of the duty cycle of the periodic switch signal and the current magnitude indicated by the magnitude control signal to be sent to said driving current generation module is substantially kept unchanged.

11. The light-emitting system of claim 9, wherein said brightness modulation module includes a supply voltage modulation device that is configured to:
compare the channel voltages respectively provided at said second terminals of said light-emitting modules with a higher limit comparison voltage and with a lower limit comparison voltage, wherein the higher limit comparison voltage is larger than the lower limit comparison voltage in magnitude;

when determining that any of the channel voltages is lower than the lower limit comparison voltage in magnitude, control said power supply module to increase the magnitude of the supply voltage; and when determining that the channel voltages all exceed the higher limit comparison voltage in magnitude, control said power supply module to decrease the magnitude of the supply voltage.

12. The light-emitting system of claim 11, wherein:
said driving system further includes a first resistor and a second resistor;
said first resistor has a first terminal that is electrically connected to said power supply module to receive the supply voltage, and a second terminal electrically connected to said power supply module;
said second resistor has a first terminal electrically connected to said second terminal of said first resistor, and a second terminal electrically connected to ground;

said supply voltage modulation device includes a number N of higher level comparators corresponding respectively to said light-emitting modules, a number N of lower level comparators corresponding respectively to said light-emitting modules, a first logic gate, a second logic gate, a supply voltage feedback modulation module and a current source;

with respect to each of said higher level comparators, said higher level comparator has a non-inverting input terminal that is electrically connected to said second terminal of the corresponding one of said light-emitting modules to receive the channel voltage provided at said second terminal, an inverting input terminal adapted to receive the higher limit comparison voltage, and an output terminal;

with respect to each of said lower level comparators, said lower level comparator has an inverting input terminal that is electrically connected to said second terminal of the corresponding one of said light-emitting modules to receive the channel voltage at said second terminal, a non-inverting input terminal adapted to receive the lower limit comparison voltage, and an output terminal;

said first logic gate has a number N of input terminals and an output terminal, wherein said input terminals are electrically connected to said output terminals of said higher level comparators, respectively;

said second logic gate has a number N of input terminals and an output terminal, wherein said input terminals are electrically connected to said output terminals of said lower level comparators, respectively;

said current source is electrically connected to said second terminal of said first resistor, and is configured to generate a modulation current that flows through said first resistor so as to control said power supply module to modulate the magnitude of the supply voltage;

said supply voltage feedback modulation module has a first input terminal electrically connected to said output terminal of said first logic gate, a second input terminal electrically connected to said output terminal of said second logic gate, and an output terminal electrically connected to said current source, wherein said supply voltage feedback modulation module is configured to generate a control signal at said output terminal thereof to control said current source to modulate a magnitude of the modulation current;

said supply voltage modulation device is configured such that when a signal provided at said output terminal of said first logic gate indicates that said higher level comparators all output logical one at their respective output terminals, said supply voltage feedback modulation module modulates the control signal to reduce the magnitude of the modulation current, so as to reduce the magnitude of the supply voltage;

said supply voltage modulation device is configured such that when a signal provided at said output terminal of said second logic gate indicates that any of said lower level comparators outputs logical one at its output terminal, said supply voltage feedback modulation module modulates the control signal to increase the magnitude of the modulation current, so as to increase the magnitude of the supply voltage; and said supply voltage modulation device is configured such that when the signal provided at said output terminal of said second logic gate indicates that said lower level comparators all output logical zero at their respective output terminals, and when the signal provided at said output terminal of said first logic gate indicates that any of said higher level comparators outputs logical zero at its output terminal, said supply voltage feedback modulation module does not modulate the control signal so that the magnitude of the modulation current and the magnitude of the supply voltage are substantially kept unchanged.

13. The light-emitting system of claim 9, wherein said driving system further includes:
a failure determination circuit that is adapted to receive an open circuit comparison voltage and a short circuit comparison voltage, is electrically connected to said second terminals of said light-emitting modules to receive the channel voltages respectively provided at said second terminals, and is configured to, with respect to each of said driving current generation modules,
compare the channel voltage provided at said second terminal of the corresponding one of said light-emitting modules with the open circuit comparison voltage and with the short circuit comparison voltage;
when determining that the channel voltage is lower than the open circuit comparison voltage in magnitude, output an open circuit failure signal indicating that the corresponding one of said light-emitting modules is in an open circuit state; and
when determining that the channel voltage is higher than the short circuit comparison voltage in magnitude, output a short circuit failure signal indicating that the corresponding one of said light-emitting modules is in a short circuit state.

14. The light-emitting system of claim 13, wherein:
said failure determination circuit includes a number N of open circuit comparators corresponding respectively to said light-emitting modules and a number N of short circuit comparators corresponding respectively to said light-emitting modules;
said open circuit comparators each have an inverting input terminal that is electrically connected to the said second terminal of the corresponding one of said light-emitting modules to receive the channel voltage provided at said second terminal, a non-inverting input terminal that is adapted to receive the open circuit comparison voltage, and an output terminal;
with respect to each of said open circuit comparators, said open circuit comparator is configured to output the open circuit failure signal at its output terminal when the channel voltage received by said open circuit comparator is lower than the open circuit comparison voltage in magnitude;
said short circuit comparators each have a non-inverting input terminal that is electrically connected to the said second terminal of the corresponding one of said light-emitting modules to receive the channel voltage provided at said second terminal, an inverting input terminal that is adapted to receive the short circuit comparison voltage, and an output terminal; and
with respect to each of said short circuit comparators, said short circuit comparator is configured to output the short circuit failure signal at its output terminal when the channel voltage received by said short circuit comparator is higher than the short circuit comparison voltage in magnitude.

15. The light-emitting system of claim 9, wherein said driving current generation modules each include:
a switch that includes a first terminal electrically connected to said second terminal of said light-emitting module corresponding to said driving current generation module, a control terminal electrically connected to said brightness modulation module to receive the periodic switch signal, and a second terminal, wherein said switch is configured to switch between conduction and non-conduction based on the periodic switch signal thus received, and conducts only when the periodic switch signal is at the active logic level; and
a current source that is electrically connected between said second terminal of said switch and ground, that is electrically connected to said brightness modulation module to receive the magnitude control signal, and that is configured to generate the driving current based on the magnitude control signal thus received when said switch conducts.

16. The light-emitting system of claim 9, wherein:
said driving system further includes a first resistor and a second resistor;
said first resistor has a first terminal and a second terminal;
said second resistor is electrically connected between said second terminal of said first resistor and ground;
said power supply module includes a boost inductor, a switch, a boost diode, an output capacitor and a switch controller;
said boost inductor includes a first terminal adapted to receive an input voltage, and a second terminal;
said switch includes a first terminal electrically connected to said second terminal of said boost inductor, a control terminal, and a second terminal electrically connected to ground;
said boost diode includes an anode terminal electrically connected to said second terminal of said boost inductor, and a cathode terminal;
said output capacitor includes a first terminal and a second terminal, wherein said first terminal provides the supply voltage and is electrically connected to said cathode terminal of said boost diode and said first terminal of said first resistor, and said second terminal is electrically connected to ground; and
said switch controller is electrically connected to said second terminal of said first resistor to receive a feedback voltage provided at said second terminal, is further electrically connected to said control terminal of said switch, and is configured to control switching of said switch between conduction and non-conduction and to modulate a duty cycle of said switch based on the feedback voltage.

17. The light-emitting system of claim 9, wherein said brightness modulation module includes a channel voltage modulation device that is configured to, with respect to each of said driving current generation modules,
compare the channel voltage provided at said second terminal of the corresponding one of said light-emitting modules with the reference voltage; and
when determining that the channel voltage exceeds the reference voltage in magnitude, modulate the magnitude control signal to be sent to said driving current generation module in such a way that the current magnitude indicated by the magnitude control signal is increased.

18. The light-emitting system of claim 17, wherein said channel voltage modulation device is configured to, with respect to each of said driving current generation modules,
when determining that the channel voltage of said driving current generation module does not exceed the reference voltage in magnitude, record a compensation coefficient that is a ratio of a present value of the current magnitude indicated by the magnitude control signal to an initial value of the current magnitude, wherein the present value is the value that the current magnitude indicated by the magnitude control signal currently has, and the initial value is the value that the current magnitude indicated by the magnitude control signal previously had when its value had never been increased, and modulate a duty cycle of the periodic switch signal to be sent to said driving current generation module based on the compensation coefficient thus recorded.

19. The light-emitting system of claim 17, wherein:

said channel voltage modulation device includes a multiplexer electrically connected to said second terminals of said light-emitting modules, a comparator electrically connected to said multiplexer, a channel voltage feedback modulation module electrically connected to said multiplexer and said comparator, and a brightness management device electrically connected to said channel voltage feedback modulation module and said driving current generation modules;

said multiplexer is configured to receive the channel voltages respectively provided at said second terminals of said light-emitting modules and a selection signal that is related to one of said driving current generation modules, and to output one of the channel voltages that is provided at said second terminal of said light-emitting module that corresponds to the one of said driving current generation modules to serve as a selected channel voltage;

said comparator is configured to receive the selected channel voltage from said multiplexer, to receive the reference voltage, and to provide a comparison result by comparing the selected channel voltage with the reference voltage;

said channel voltage feedback modulation module is configured to receive the comparison result from said comparator, to provide the selection signal to said multiplexer, and to generate and output an output signal based on the comparison result and based on which one of said driving current generation modules is related to the selection signal; and said brightness management device is configured to generate the periodic switch signals and the magnitude control signals to be outputted to said driving current generation modules, to receive the output signal from said channel voltage feedback modulation module and a brightness value, and to modulate, based on the output signal and the brightness value, the periodic switch signal and the magnitude control signal that are to be outputted to said driving current generation module related to the selection signal.

* * * * *